(12) United States Patent
Koga et al.

(10) Patent No.: US 6,642,483 B1
(45) Date of Patent: Nov. 4, 2003

(54) HIGH-SPEED $CO_2$ GAS WELDING METHOD

(75) Inventors: Yasuhiro Koga, Kitakyushu (JP);
Hiroyuki Handa, Kitakyushu (JP);
Shinji Okumura, Kitakyushu (JP);
Haruki Nakashima, Kitakyushu (JP);
Takafumi Mitsushio, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 0 days.

(21) Appl. No.: 09/926,650

(22) PCT Filed: May 26, 2000

(86) PCT No.: PCT/JP00/03425

§ 371 (c)(1),
(2), (4) Date: Nov. 28, 2001

(87) PCT Pub. No.: WO00/73010

PCT Pub. Date: Dec. 7, 2000

(30) Foreign Application Priority Data

May 28, 1999 (JP) ............................................ 11-150741

(51) Int. Cl.[7] .................................................. B23K 9/10
(52) U.S. Cl. ............................. 219/137 PS; 219/130.01
(58) Field of Search ...................... 219/137 PS, 130.01, 219/130.21, 130.33, 130.5, 137 R, 137.71

(56) References Cited

U.S. PATENT DOCUMENTS 4,000,374 A * 12/1976 Keyser ................... 219/130.33
6,498,321 B1 * 12/2002 Fulmer et al. .......... 219/137 PS

FOREIGN PATENT DOCUMENTS

JP    61-195782    8/1986

* cited by examiner

Primary Examiner—Clifford C. Shaw
(74) Attorney, Agent, or Firm—Armstrong, Westerman & Hattori, LLP

(57) ABSTRACT

A welding voltage is determined based on an expression, $P=k_2 \times Vw^2 + k_3 \times Vw$, where, with a welding wire feed speed and a welding wire radius used as inputs, a power factor is P(kW), the a melting speed of a welding wire is Vw(g/sec), and k2 and k3 are constants ($k_2=0.898$ and $k_3=4.625$).

5 Claims, 8 Drawing Sheets

WELDING WIRE FEEDING DEVICE

Fig. 6
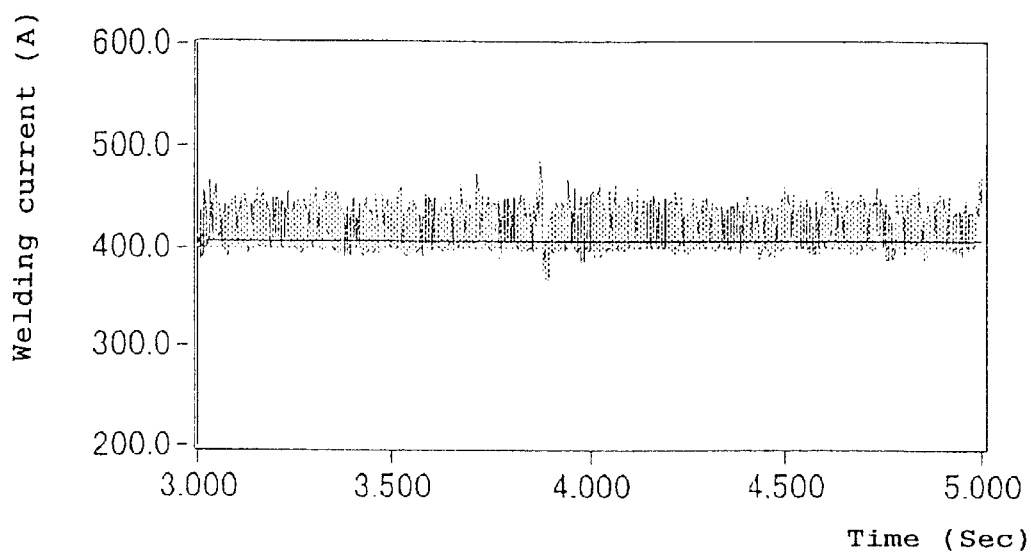
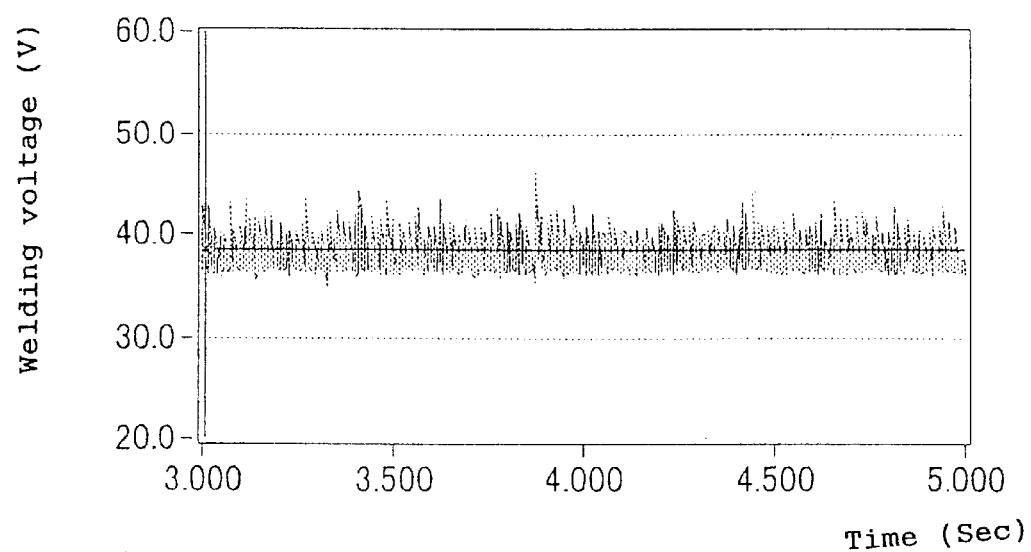

Fig. 7
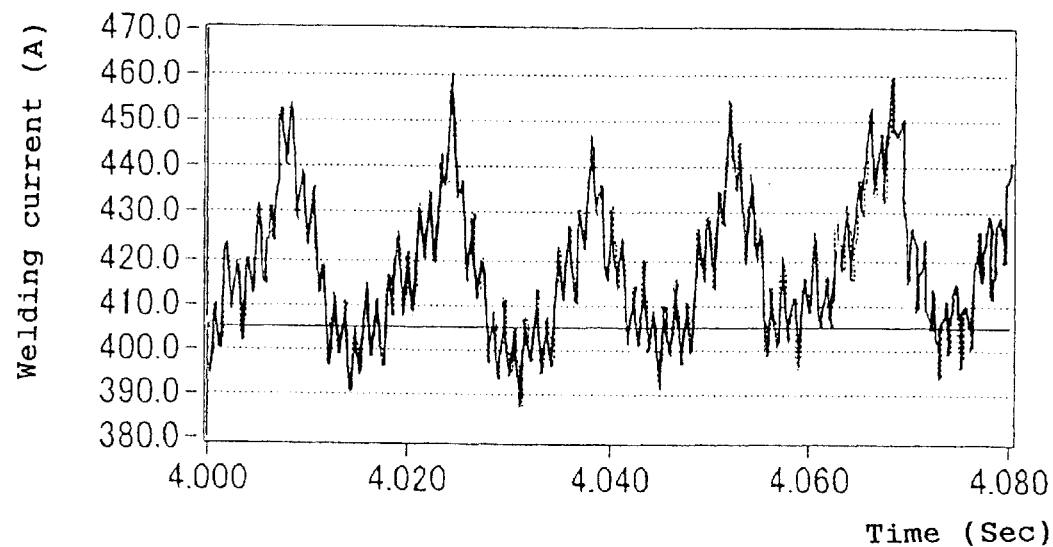
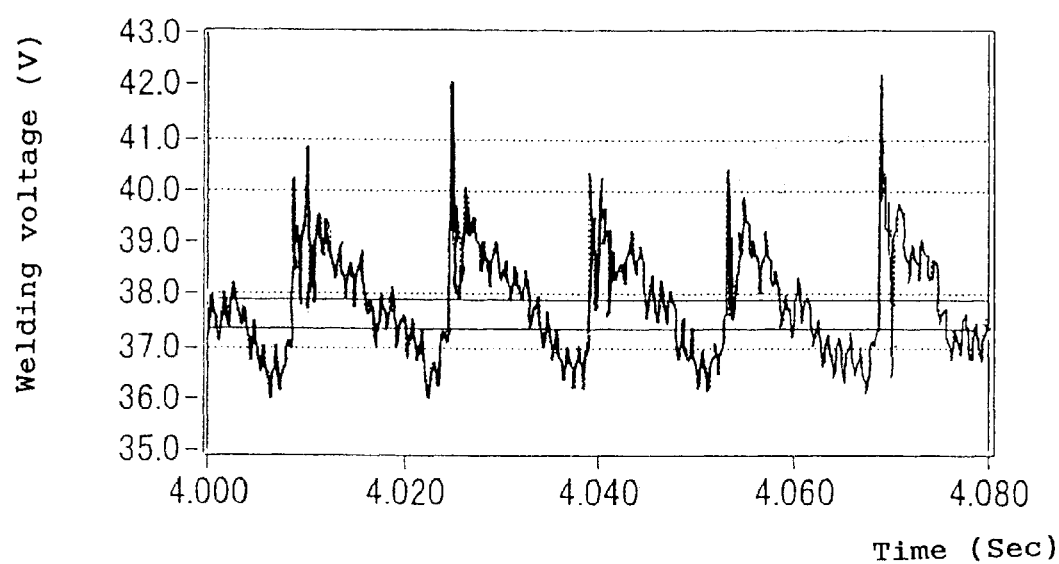

HIGH-SPEED CO₂ GAS WELDING METHOD

TECHNICAL FIELD

The present invention relates to a high-speed $CO_2$ gas welding method, and more particularly it relates to a method for transferring globules at an almost fixed state, without any accompanying short-circuit, at areas whose voltage is made higher than that in a buried arc area, humping area, and fusing area when carrying out high-speed welding whose speed is 5 meters per minute or more.

BACKGROUND ARTS

In a high-speed $CO_2$ gas welding method whose welding speed exceeds 1.5 meters per minute, no spray transfer is brought about as in inert gas arc welding even if the welding current is increased, the size of the globules becomes remarkably large, wherein short-circuit transfer and globular transfer coexist to cause the stability of the arc to be impaired, and a great deal of spatter occurs.

Also, an action of electromagnetic pressure resulting from an electromagnetic force of an arc itself cannot be ignored, and the influence is reflected by the formation of beads, wherein the surface of a molten pool is subjected to the action and is recessed, and a gouging area in which the bottom of the molten pool or its peripheries are exposed is formed. In addition, as the action of the arc pressure is intensified, that is, the current is increased, the gouging area is widened. Finally, a problem occurs in that solidification at the peripheral portions of the molten pool precedes in a state where the gouging area is not sufficiently filled up due to the exposed portion thereof, wherein humping beads accompanying undercuts are brought about.

Conventionally, in order to solve such a problem in high-speed welding, if a buried arc system is employed, in which the arc length is shortened with the welding voltage being further lowered than usual, it was considered that there was an effect of suppressing generation of large-grained spatter, undercuts and/or humping beads.

However, if the above-described buried arc system is employed in areas in which the welding speed exceeds 1.5 meters per minute, another problem occurs in that the arc heat source is buried deep from the surface of a base metal to cause deep penetration. Further, as shown in FIG. 8, the penetration at the welding joint is made deep, and the surface portion thereof is widened to become projection beads, wherein a constricted portion occurs (to be shaped like a mushroom), and no smooth bead penetration and surface shape can be obtained as in MAG welding. Then, notch toughness of the joint portions is caused to remarkably deteriorate.

DISCLOSURE OF THE INVENTION

It is therefore an object of the invention to provide a high-speed $CO_2$ gas welding method that can remarkably reduce spatter and bring about smooth bead penetration and surface shape as in MIG and MAG welding without producing any undercut and humping beads.

In order to solve the above-described problem, in a high-speed $CO_2$ gas welding method whose welding speed exceeds 1.5 meters per minute according to the invention, a welding voltage and a welding current are determined on the basis of an expression $P=K1\times Vw$, where, with a welding wire feed speed and a welding wire radius used as inputs, a power factor is P(kW), a melting speed of the welding wire is Vw(g/sec), and k1 is a constant.

Also, in a high-speed $CO_2$ gas welding method whose welding speed is more than and including 2 meters per minute and less than and including 2.5 meters per minute according to the invention, a welding voltage is determined in a range from $6.25 \leq k1 \leq 7.41$ on the basis of an expression $P=K1\times Vw$, where, with a welding wire feed speed and a welding wire radius used as inputs, a power factor is P(kW), a melting speed of the welding wire is Vw(g/sec), and k1 is a constant.

Also, a welding voltage is determined on the basis of an expression $P=k2\times Vw^2+k3\times Vw$, where, with a welding wire feed speed and a welding wire radius used as inputs, a power factor is P(kW), a melting speed of the welding wire is Vw(g/sec), and k2 and k3 are constants.

Also, the above-described constants k2 and k3 areas follows; k2=0.898 and k3=4.625.

In addition, it is assumed that the welding is carried out by a welding apparatus including a robot-controlling device.

BRIEF DESCRIPTION OF THE DRAWINGS

FIG. 6 is a graph showing waveforms of a welding current and a welding voltage according to the embodiment of the invention;

FIG. 7 is a graph showing waveforms of a welding current and a welding voltage according to the embodiment of the invention.

BEST MODE FOR CARRYING OUT THE INVENTION

Hereinafter, a description is given of the embodiment on the basis of the accompanying drawings.

Figure 1:
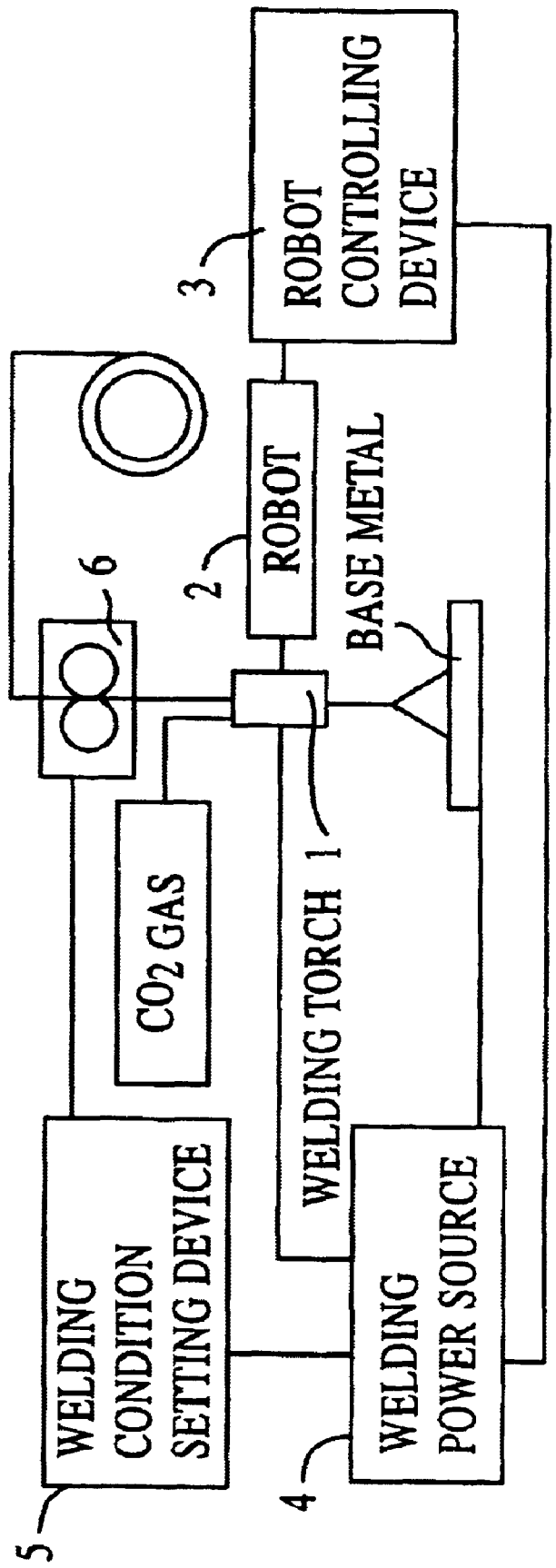
FIG. 1 is a construction view of a welding apparatus according to an embodiment of the invention.

FIG. 1 is a construction view showing the embodiment of the invention. In the drawing, 1 denotes a welding torch. The welding torch 1 is attached to the tip end of a robot 2 and carries out welding along an appointed locus in compliance with a program stored in a robot-controlling device 3. 4 denotes a welding power source that supplies welding power to the welding torch 1 in response to instructions from the robot controlling device 3. Also, the welding power source 4 is provided with a feature of detecting a short-circuit between a welding wire and a base metal, and a feature of raising a short-circuit releasing current of at least 500 A/msec when having detected the short-circuit. 5 denotes a welding condition setting device that, when an operator inputs a welding current, a welding voltage, and a welding speed, instructs a welding current and a welding voltage to the welding power source 4 and gives an instruction of a welding wire feed speed to a welding wire feeding device 6.

Figure 2:
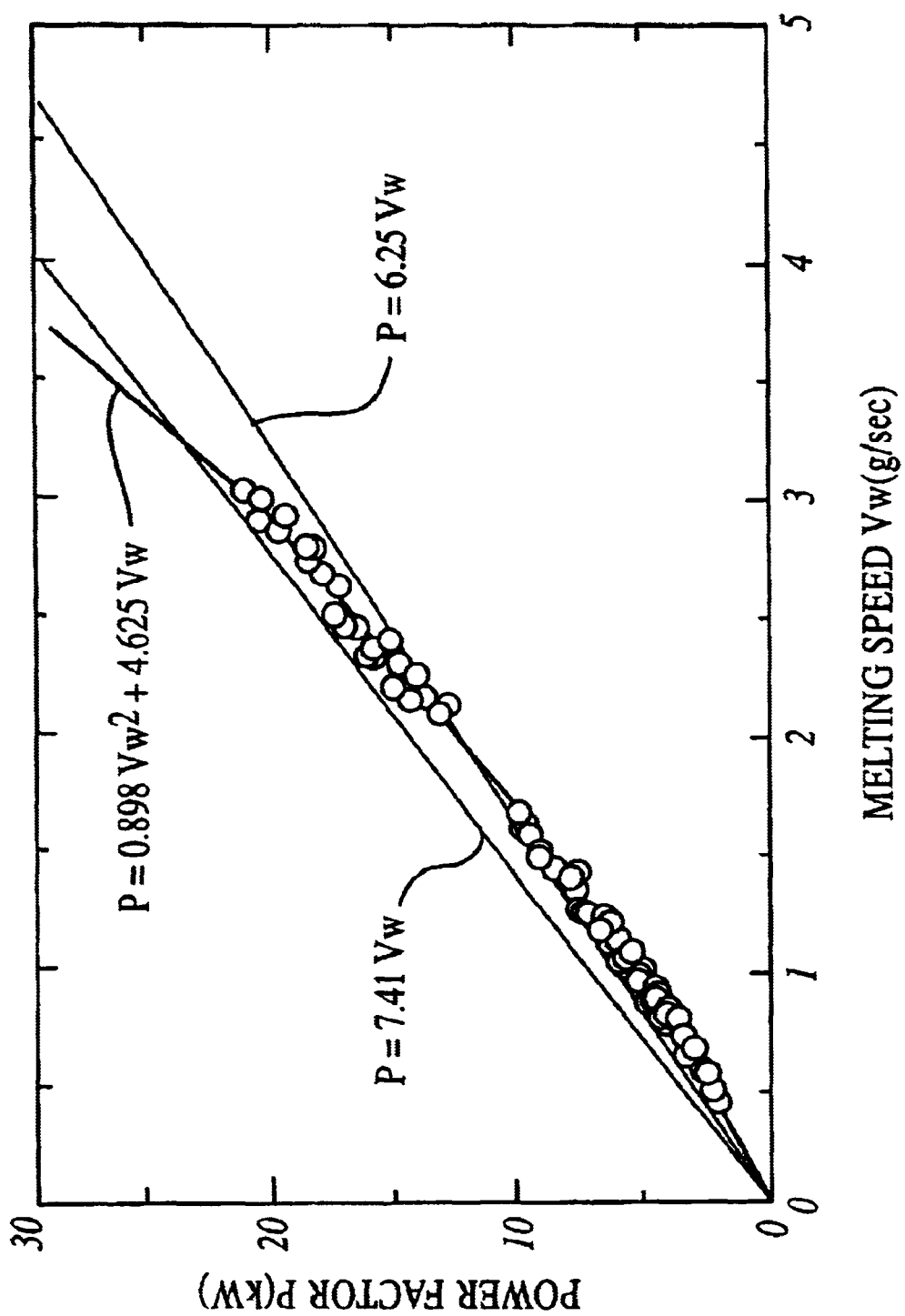
FIG. 2 is a graph showing the relationship between a melting speed and power factor according to the embodiment of the invention.
Figure 3:
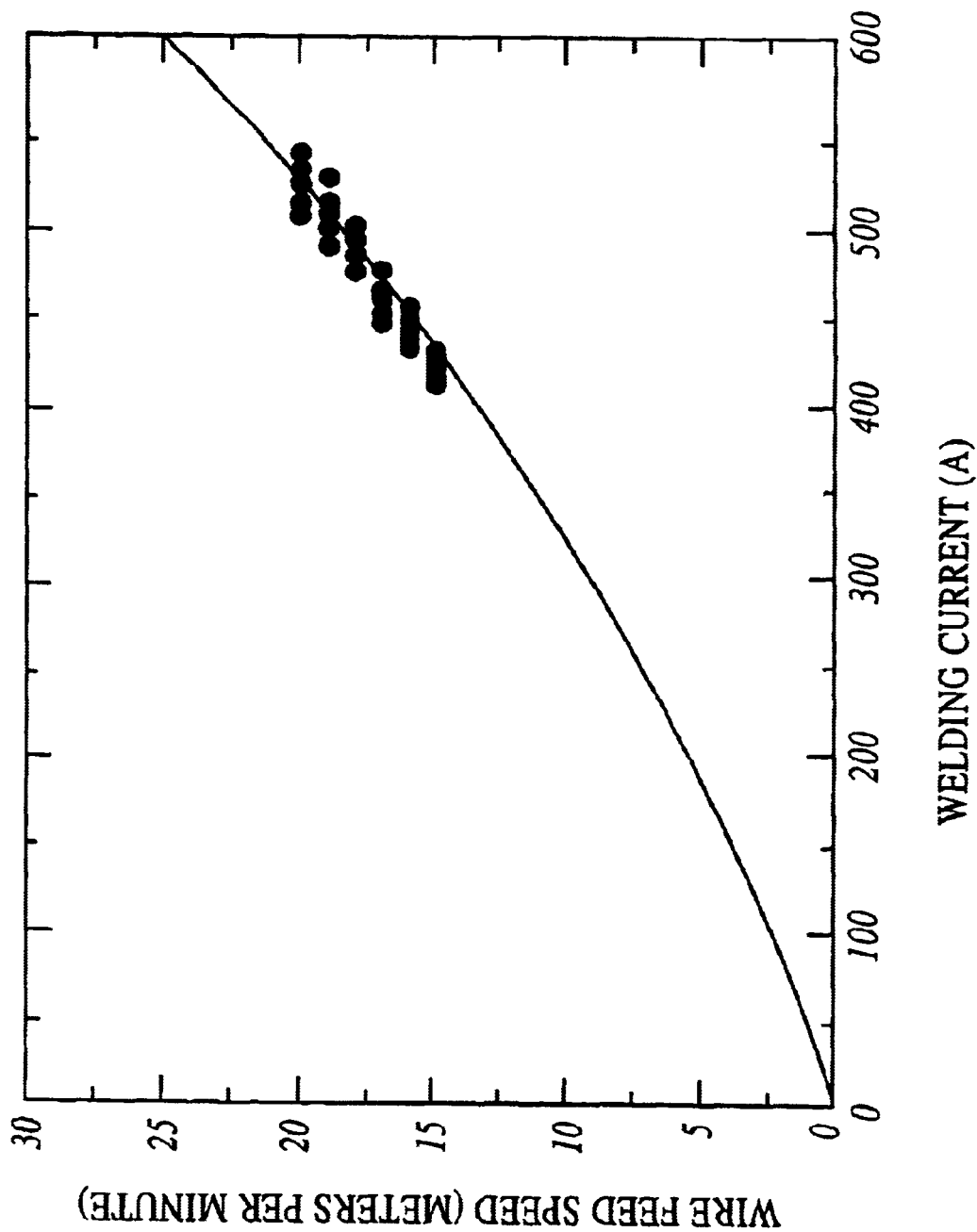
FIG. 3 is a graph showing the relationship between a welding current and a welding wire feed speed according to the embodiment of the invention.

The present inventor carried out welding while varying the wire feed speed, welding current and welding voltage at welding speeds of 2 meters per minute and 2.5 meters per minute, using the above-described welding device. Further, through the above-described experiments, the inventor analyzed the relationship between the welding wire melting speed Vw(g/sec) and power factor P(kW) of the welding power source in connection with those that meet the conditions of globule transfer at an almost fixed state without any short-circuit accompanied, at areas whose voltage is made higher than that in a buried arc area, humping area, and fusing area, and the relationship between the welding current I(A) and the welding wire feed speed Vf(m/min). FIG. 2 and FIG. 3 are graphs showing the results of these analyses. FIG. 2 shows the actual results marked with circles with the welding wire melting speed Vw taken as the abscissa and the power factor P of the welding power source taken as the ordinate. Also, FIG. 3 shows the actual results marked with black circles with the welding current I taken as the abscissa and the welding wire feed speed Vf taken as the ordinate. In addition, the extension of the wire is 15 mm in the experiments.

Herein, the relationship between the power factor P and the melting speed Vw of a welding wire is obtained. It is assumed that the relationship between the power factor P and the melting speed Vw is as in the following expressions.

$$P = k1 \times Vw \quad \text{(Expression 1)}$$

$$P = k2 \times Vw^2 + k3 \times Vw \quad \text{(Expression 2)}$$

Expression 1 is approximated by the primary expression of the melting speed Vw, and Expression 2 is approximated by the secondary expression. k1, k2 and k3 are coefficients. Judging from the results of the analysis shown in FIG. 2, the coefficients k1, k2 and k3 are obtained, that is, $6.25 \leq k1 \leq 7.41$, $k2=0.898$, and $k3=4.625$ are obtained.

Where it is assumed that the sectional area of the welding wire is $S(mm^2)$ and the density of the welding wire is $\rho(g/mm^3)$, the welding wire melting speed Vw can be obtained by the following expression.

$$Vw = Vf \times S \times \rho \quad \text{(Expression 3)}$$

The welding wire feed speed Vf is generally obtained by the following expression on the basis of the Lesnevich equation.

$$Vf = a \times I + b \times L \times I^2 \quad \text{(Expression 4)}$$

where a and b are coefficients, I is a welding current, and L is the wire extension of a welding wire (mm). The coefficients a and b are obtained from the results of the analysis shown in FIG. 3, $a=2.05 \times 10^{-2}$, $b=2.72 \times 10^{-6}$ are obtained. Also, the extension L of the welding wire is 15(mm) on the basis of the experimental conditions.

Therefore, I is solved by substituting a value of the welding wire feed speed Vf into Expression 4, and the value of the welding current I is determined.

The work factor P of the welder power source is a product of a welding voltage V and a welding current I. Therefore, the work factor P can be obtained from the following expression.

$$P = V \times I \quad \text{(Expression 5)}$$

Since the section area S of a welding wire is obtained from the welding wire radius r, the same can be obtained from the following expression.

$$S = \pi r^2 \quad \text{(Expression 6)}$$

The welding voltage V can be obtained by $$V = k1 \times \rho \times \pi r^2 \times Vf/I \quad \text{(Expression 7)}$$ on the basis of Expressions 1, 3, 5 and 6 or $$V = [k2 \{\rho \times \pi r^2 \times Vf\}^2 + k3 \{\rho \times \pi r^2 \times Vf\}]/I \quad \text{(Expression 8)}$$ on the basis of Expressions 2, 3, 5 and 6.

As described above, where the welding wire feed speed Vf and the welding wire radius r are determined, it is possible to derive the welding voltage V and welding current I thereof.

Figure 4:
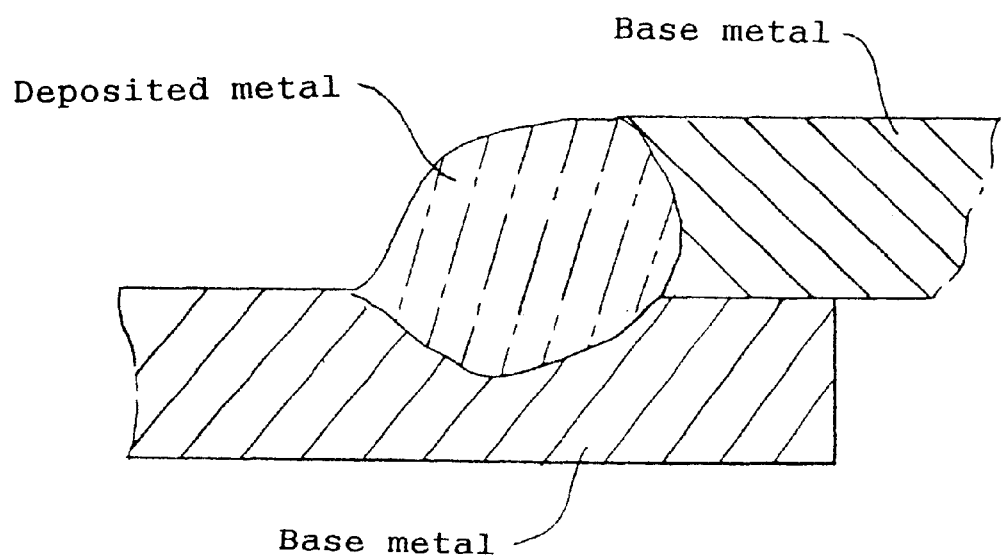
FIG. 4 is a sketch showing a section of a welding joint according to the embodiment of the invention.
Figure 5:
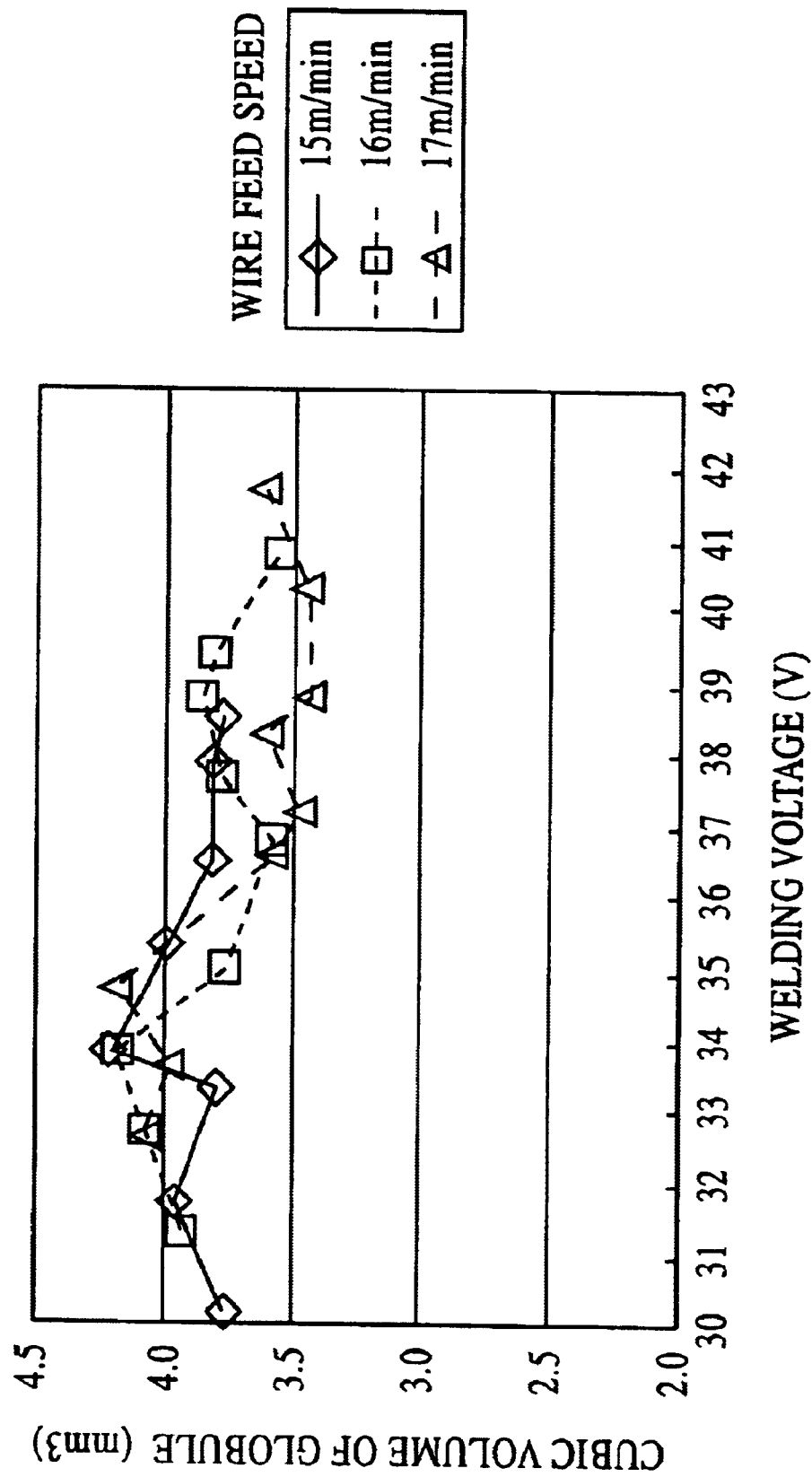
FIG. 5 is a graph showing the relationship between a welding voltage and a cubic volume of a globule according to the embodiment of the invention.
Figure 8:
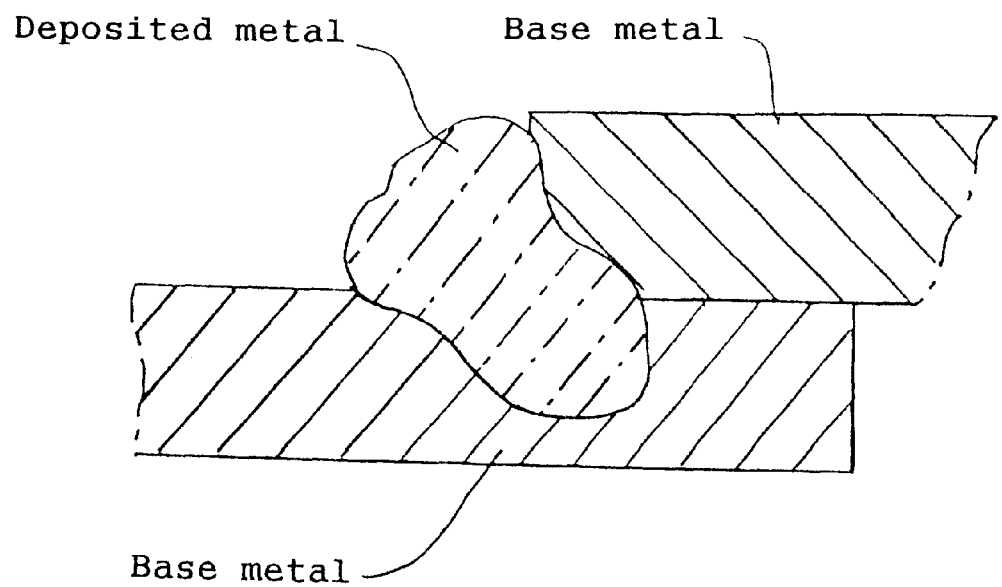
FIG. 8 is a sketch showing a section of a welding joint according to a prior art.

Next, a description is given of effects of the invention. FIG. 4 is a sketch of the section of lap fillet welding that is carried out by high-speed $CO_2$ gas welding at a welding speed of 2.0 meters per minute where the welding voltage and welding current are determined by the method according to the invention. The penetration of molten metal is adequate, and no undercut is produced. FIG. 5 is a graph showing the relationship between the welding voltage and the cubic volume of a globule where high-speed $CO_2$ gas welding was carried out by the method according to the invention. The cubic volume of globules is made roughly constant regardless of the welding voltage. FIG. 6 shows waveforms of the welding current and welding voltage where high-speed $CO_2$ gas welding was carried out by the method according to the invention. No voltage drop resulting from generation of a short-circuit is recognized. This shows that almost no short-circuit occurs. FIG. 7 shows waveforms of the welding current and welding voltage where high-speed $CO_2$ gas welding was carried out by the method according to the invention, and these are waveforms which are obtained by enlarging a part of the waveforms shown in FIG. 6. FIG. 7 shows that globules are transferred at an almost fixed state, and stabilized welding is carried out.

As described above, according to the invention, since, the high-speed $CO_2$ gas welding, the welding voltage and welding current are determined so that the cubic volume of globules are made roughly constant with the welding wire feed speed and welding wire radius taken as inputs, there are several effects such as:

Welding that does not accompany any short-circuit can be achieved;

Smooth bead penetration and surface shape can be obtained as in MIG and MAG welding.

Spatter that is generated and is splashed during welding can be remarkably reduced.

INDUSTRIAL APPLICABILITY

The present invention is effective as a high-speed $CO_2$ gas welding method, in particular, a high-speed $CO_2$ gas welding method whose welding speed exceeds 1.5 meters per minute.

What is claimed is:

1. A high-speed $CO_2$ gas welding method whose welding speed is 1.5 meters per minute or more, comprising determining a welding power on the basis of an expression $P = k1 \times Vw$, where P is the power in kW, Vw is a melting speed of the welding wire in g/sec, and k1 is a constant having units of kW-sec/g.

2. A high-speed $CO_2$ gas welding method whose welding speed is more than and including 2 meters per minute and less than and including 2.5 meters per minute, comprising determining a welding power on the basis of an expression $P = k1 \times Vw$, where P is the power in kW, Vw is a melting speed of the welding wire in g/sec, and k1 is a constant lying within a range from $6.25 \leq k1 \leq 7.41$ and having units of kW-sec/g.

3. A high-speed $CO_2$ gas welding method whose welding speed is 1.5 meters per minute or more, comprising determining a welding power on the basis of an expression $P=k_2 \times V_w^2 + k_3 \times V_w$, where P is the power in kW, Vw is a melting speed of the welding wire in g/sec, and k2 and k3 are constants, and wherein k3 has units of kW-sec/g and k2 has units of $kW\text{-}sec^2/g^2$.

4. The high-speed $CO_2$ gas welding method as set forth in claim 3, wherein said constants k2 and k3 approximately are k2=0.898 and k3=4.625.

5. The high-speed $CO_2$ gas welding method as set forth in anyone of claims 1 through 4, wherein high-speed $CO_2$ gas welding is carried out by a welding device including a robot controlling device.

* * * * *